(12) United States Patent
Ozharar et al.

(10) Patent No.: US 11,543,286 B2
(45) Date of Patent: Jan. 3, 2023

(54) DISTRIBUTED ACOUSTIC SENSING BASED ACOUSTIC WAVE SPEED SCANNING AND MAPPING OF CIVIL INFRASTRUCTURES

(71) Applicant: NEC Laboratories America, Inc., Princeton, NJ (US)

(72) Inventors: Sarper Ozharar, Princeton, NJ (US); Yue Tian, Princeton, NJ (US); Yangmin Ding, North Brunswick, NJ (US); Ting Wang, West Windsor, NJ (US)

(73) Assignee: NEC Corporation

( * ) Notice: Subject to any disclaimer, the term of this patent is extended or adjusted under 35 U.S.C. 154(b) by 16 days.

(21) Appl. No.: 17/227,328

(22) Filed: Apr. 11, 2021

(65) Prior Publication Data

US 2021/0318165 A1    Oct. 14, 2021

Related U.S. Application Data

(60) Provisional application No. 63/009,666, filed on Apr. 14, 2020.

(51) Int. Cl.
*G01H 9/00* (2006.01)
*G01D 5/353* (2006.01)

(52) U.S. Cl.
CPC ......... *G01H 9/004* (2013.01); *G01D 5/35361* (2013.01)

(58) Field of Classification Search
CPC .............................. G01H 9/004; G01H 9/006
See application file for complete search history.

(56) References Cited

U.S. PATENT DOCUMENTS

| 5,900,556 A * | 5/1999 | Ahmad | G01L 1/242 |
| | | | 250/227.14 |
| 7,536,911 B2 * | 5/2009 | Kim | G01M 11/085 |
| | | | 356/482 |
| 8,494,790 B2 * | 7/2013 | Zhu | G01N 29/227 |
| | | | 702/56 |
| 10,330,594 B2 * | 6/2019 | Eyal | G01M 11/3127 |
| 10,436,024 B2 * | 10/2019 | Bakulin | G01V 1/46 |
| 10,908,048 B2 * | 2/2021 | Loverich | G01M 13/00 |
| 11,060,950 B1 * | 7/2021 | Xia | G01M 11/3145 |
| 11,193,367 B2 * | 12/2021 | Jin | E21B 47/06 |
| 2005/0072234 A1 * | 4/2005 | Zhu | G01N 29/227 |
| | | | 702/56 |
| 2007/0266788 A1 * | 11/2007 | Kim | G01M 11/085 |
| | | | 73/588 |
| 2008/0294354 A1 * | 11/2008 | Zhu | G01H 13/00 |
| | | | 702/56 |

(Continued)

FOREIGN PATENT DOCUMENTS

| WO | WO-2010020796 A1 * | 2/2010 | ............... F17D 5/06 |
| WO | WO-2018002582 A1 * | 1/2018 | ............... B61L 1/06 |

(Continued)

*Primary Examiner* — Thomas A Hollweg
*Assistant Examiner* — Mary A El-Shammaa
(74) *Attorney, Agent, or Firm* — Joseph Kolodka

(57) ABSTRACT

Aspects of the present disclosure describe distributed fiber optic sensing (DFOS)-distributed acoustic sensing (DAS) based systems, methods, and structures that advantageously enable and/or facilitate the monitoring of civil infrastructures via acoustic wave speed measurements.

3 Claims, 5 Drawing Sheets

(56) References Cited

U.S. PATENT DOCUMENTS

| | | | |
|---|---|---|---|
| 2013/0129275 A1* | 5/2013 | Giurgiutiu | G01M 5/0066 |
| | | | 385/12 |
| 2020/0064122 A1* | 2/2020 | Nawrot | G01B 7/16 |
| 2020/0249076 A1* | 8/2020 | Ip | G01H 9/004 |
| 2020/0326261 A1* | 10/2020 | Champavere | G01M 11/3136 |
| 2020/0370950 A1* | 11/2020 | Ip | G01B 11/18 |
| 2021/0318165 A1* | 10/2021 | Ozharar | G01D 5/35361 |
| 2022/0065977 A1* | 3/2022 | Ozharar | G01S 3/8083 |
| 2022/0146304 A1* | 5/2022 | Hu | G01H 9/004 |
| 2022/0163376 A1* | 5/2022 | Xia | G01H 9/004 |

FOREIGN PATENT DOCUMENTS

| | | | | |
|---|---|---|---|---|
| WO | WO-2020097682 A1 * | 5/2020 | | G01D 5/35358 |
| WO | WO-2022046949 A1 * | 3/2022 | | G01H 9/004 |

* cited by examiner

DISTRIBUTED ACOUSTIC SENSING BASED ACOUSTIC WAVE SPEED SCANNING AND MAPPING OF CIVIL INFRASTRUCTURES

CROSS REFERENCE

This disclosure claims the benefit of U.S. Provisional Patent Application Ser. No. 63/009,666 filed 14 Apr. 2020 the entire contents of which is incorporated by reference as if set forth at length herein.

TECHNICAL FIELD

This disclosure relates generally to distributed fiber optic sensing (DFOS) systems, methods, and structures and more particularly to distributed acoustic sensing (DAS) for mapping civil infrastructures.

BACKGROUND

As is known, the ability to monitor and map civil infrastructures including buildings and bridges—among others—is of critical contemporary importance since the condition(s) of such infrastructures has fallen into a certain state of disrepair. Accordingly, systems, methods, and structures the facilitate the determination and extent of any non-uniformities that exist or are developing in such infrastructures would represent a welcome addition to the art.

SUMMARY

An advance in the art is made according to aspects of the present disclosure directed to distributed fiber optic sensing (DFOS)-distributed acoustic sensing (DAS) systems, methods, and structures that advantageously enable and/or facilitate continuous, real-time monitoring of infrastructure (i.e., buildings, bridges, etc.) condition/uniformity.

In sharp contrast to the prior art, systems, methods, and structures according to aspects of the present disclosure employ DFOS-DAS techniques to precisely measure the speed of acoustic waves at specific region(s) of infrastructure(s) to determine the existence/extent of any non-uniformities that are indicative of infrastructure decay disrepair. When such decay/disrepair is determined, appropriate remedial measures may be instituted.

BRIEF DESCRIPTION OF THE DRAWING

A more complete understanding of the present disclosure may be realized by reference to the accompanying drawing in which.

DESCRIPTION

Figure 1:
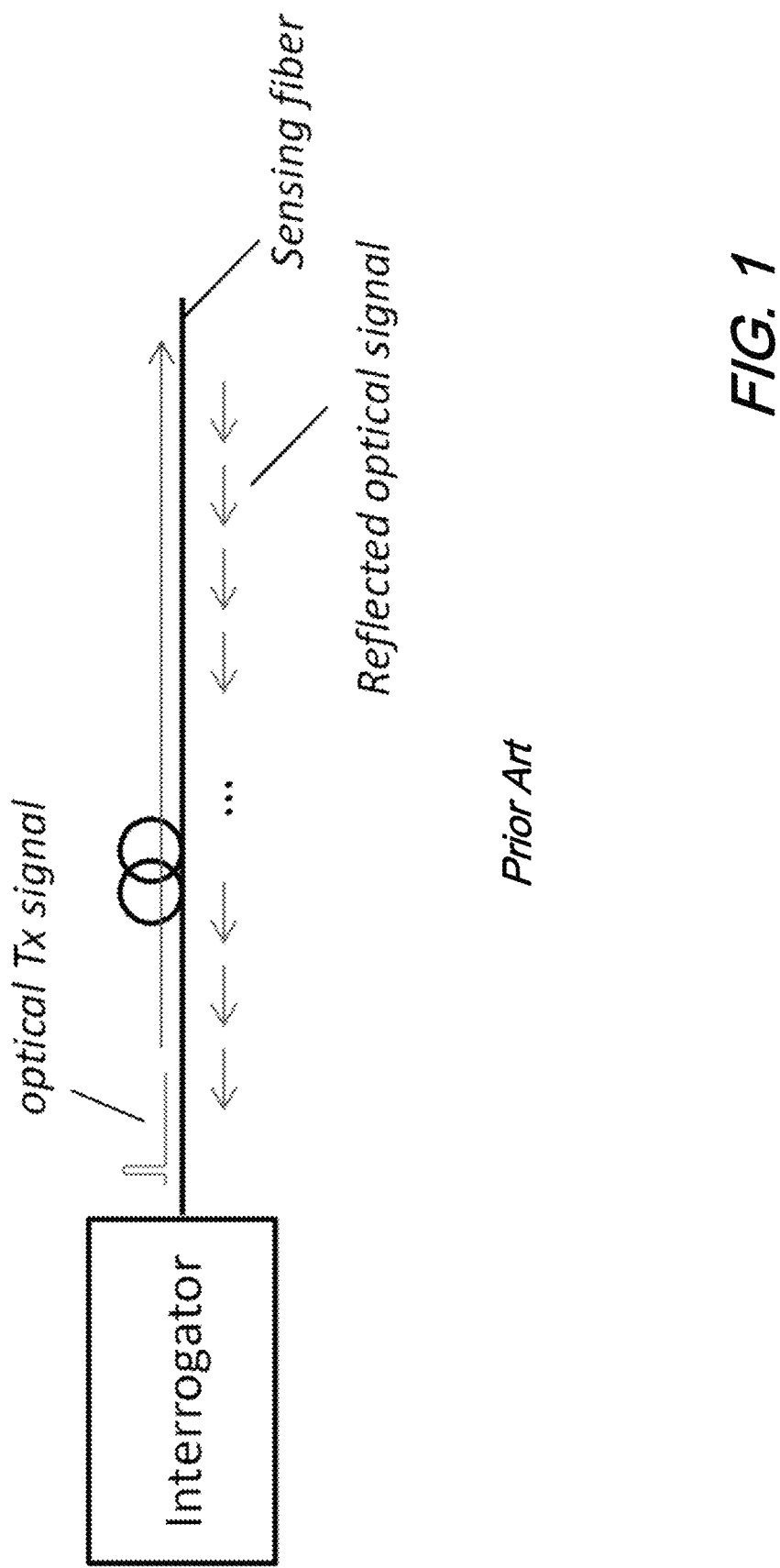
FIG. 1 is a schematic diagram of an illustrative distributed fiber optic sensing system and operation generally known in the art.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background—and with reference to FIG. 1 which is a schematic diagram of an illustrative distributed fiber optic sensing system generally known in the art—we begin by noting that distributed fiber optic sensing (DFOS) is an important and widely used technology to detect environmental conditions (such as temperature, vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes. Without losing generality, the following description assumes reflected signal though the same approaches can be applied to forwarded signal as well.

As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber.

As we shall show and describe—systems, methods, and structures according to aspects of the present disclosure employs a DAS (Distributed Acoustic Sensor) interrogator to recover a vibration occurring anywhere along a sensing fiber in equivalent sampling frequency of the pulse repetition rate. For example, for a DAS that uses pulses of 20 kHz repetition rate, the vibration at the point of interest will be sampled at 20 kHz frequency which—as those skilled in the art will understand and appreciate—is able to cover frequency of up to 10 kHz according to Nyquist rule.

By employing DAS principles to infrastructures, we note that a propagation speed of an acoustic wave along a structure depends on structural parameters such as bulk modulus, shear modulus and density. If one or more of these parameters are non-uniform over a structure, or change over time, so will the acoustic wave-speed.

According to aspects of the present disclosure then—measuring an acoustic wave-speed in a structure together with its spatial distribution on that structure and monitoring it (the acoustic wave-speed) over a period of time, we can advantageously and surprisingly track any changes and/or non-uniformities that have occurred or are occurring in a structure.

As we shall show and describe further, systems, methods, and structures according to aspects of the present disclosure measure the speed of acoustic wave(s) in/on a specific region of a structure and measure such speed at different regions along the structure. Generally, systems, methods, and structures according to aspects of the present disclosure employ at least three physical units working in parallel which—for the purposes of this disclosure—we note as Unit 1, Unit 2, and Unit 3.

Operationally, unit 1 includes two transducers that generate carefully timed acoustic impulses/signals at different times and at different points along the structure.

Unit 2 includes a fiber optical cable positioned at pre-determined point(s) or along a pre-determined section(s) of the structure.

Unit 3 includes a distributed acoustic sensing (DAS) system—including interrogator and analysis system(s)—which measures the acoustic signals, generated by the first unit, propagating from its transducer through the structure to the optical fiber cable, causing a temporally varying strain at the fiber.

As we shall show and describe, by analyzing the arrival times of acoustic signals to the fiber, and the relative positions of the transducers on the structure, it is possible to calculate the average propagation speed of the acoustic signal along the structure. Of particular advantage, systems, methods, and structures according to aspects of the present disclosure may be used to monitor/analyze structures having optical fiber already installed—such as utility poles, bridges, tunnels, buildings, etc.—or any structure requiring examination and where such a fiber can be installed.

Figure 2:
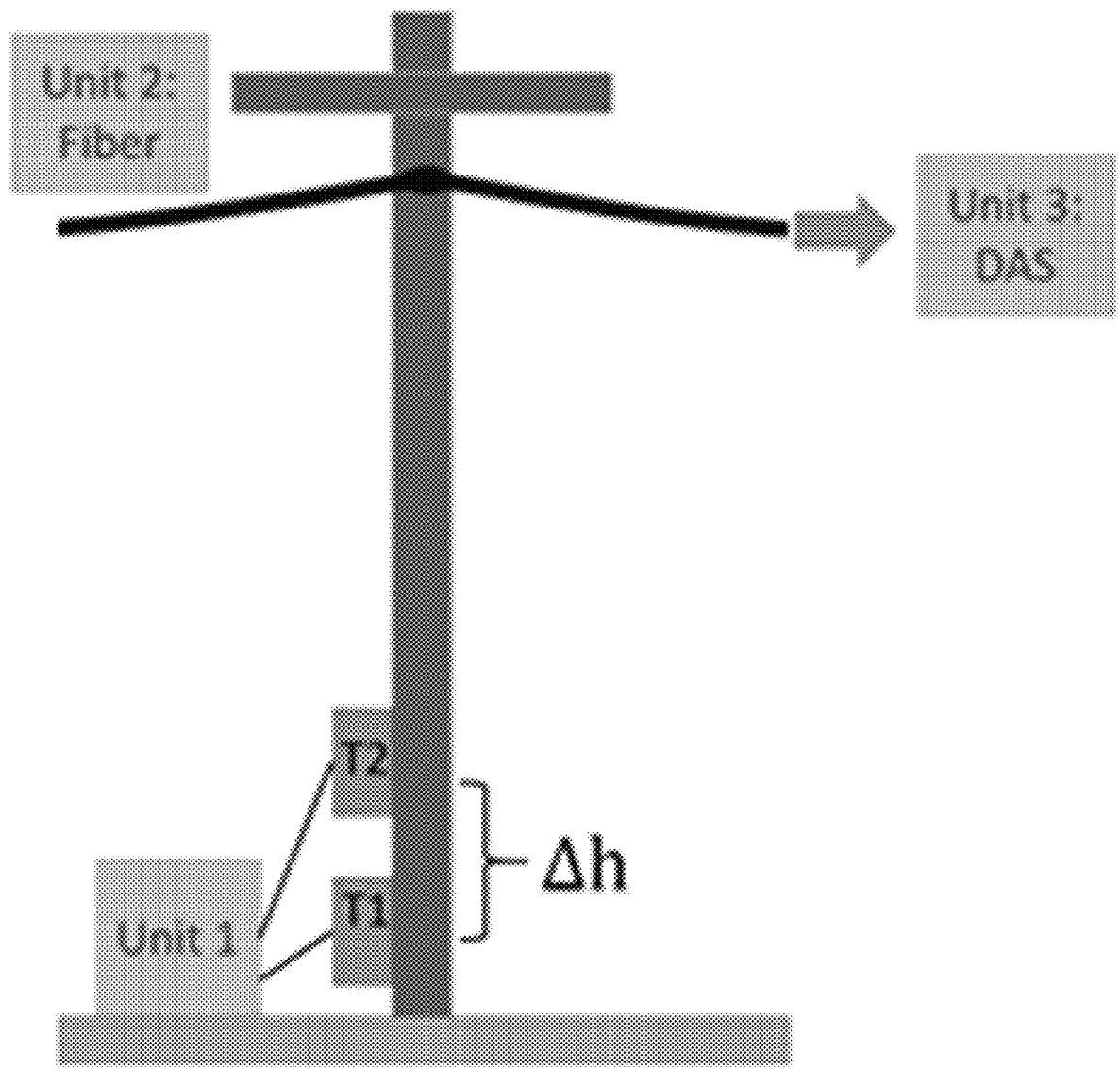
FIG. 2 is a schematic diagram illustrating an overall layout arrangement for a utility pole according to aspects of the present disclosure.

FIG. 2 is a schematic diagram illustrating an overall layout arrangement for a utility pole according to aspects of the present disclosure. As may be observed from this illustrative figure, a utility pole is shown suspending an optical fiber which in turn is optically connected to a distributed acoustic sensing (DAS system) not specifically shown which would include the DOFS system including interrogator and analyzer noted previously. Shown further in this figure are a pair of transducers as part of unit 1, shown attached to the utility pole—and vertically spaced apart from one another by an amount delta-h. Operationally, the two transducers may be made operative and induce mechanical vibrations into the pole which are further induced into the optical fiber and detected through the operation of the DAS.

As will be readily appreciated by those skilled in the art, the DAS system can detect very small vibrations of a structure—in this illustrative example the utility pole. By combining this capability with its temporal resolution, we are advantageously able to measure a time delay between the generation of an acoustic event at a given location and the detection of this event at the fiber. Since the distance between the event location and the fiber cannot be precisely controlled in a practical way, this simple approach may be further improved for speed measurement.

According to aspects of the present disclosure, we employ two separate transducers having a well-defined spatial and temporal distance, such that both are driven by the same Unit 1. This secondary transducer allows us to accurately calculate the acoustic wave speed.

Still further according to aspects of the present disclosure, by placing the two transducers at different locations along the structure (utility pole), we are advantageously able to map the acoustic wave-speed of the structure, which may reveal any non-uniformity of the structure.

In short, systems, methods, and structures according to aspects of the present disclosure integrate a portable dynamic excitation source to the DAS system, and using this integrated device at different locations/regions of a structure we advantageously obtain spatial distribution information.

Figure 3:
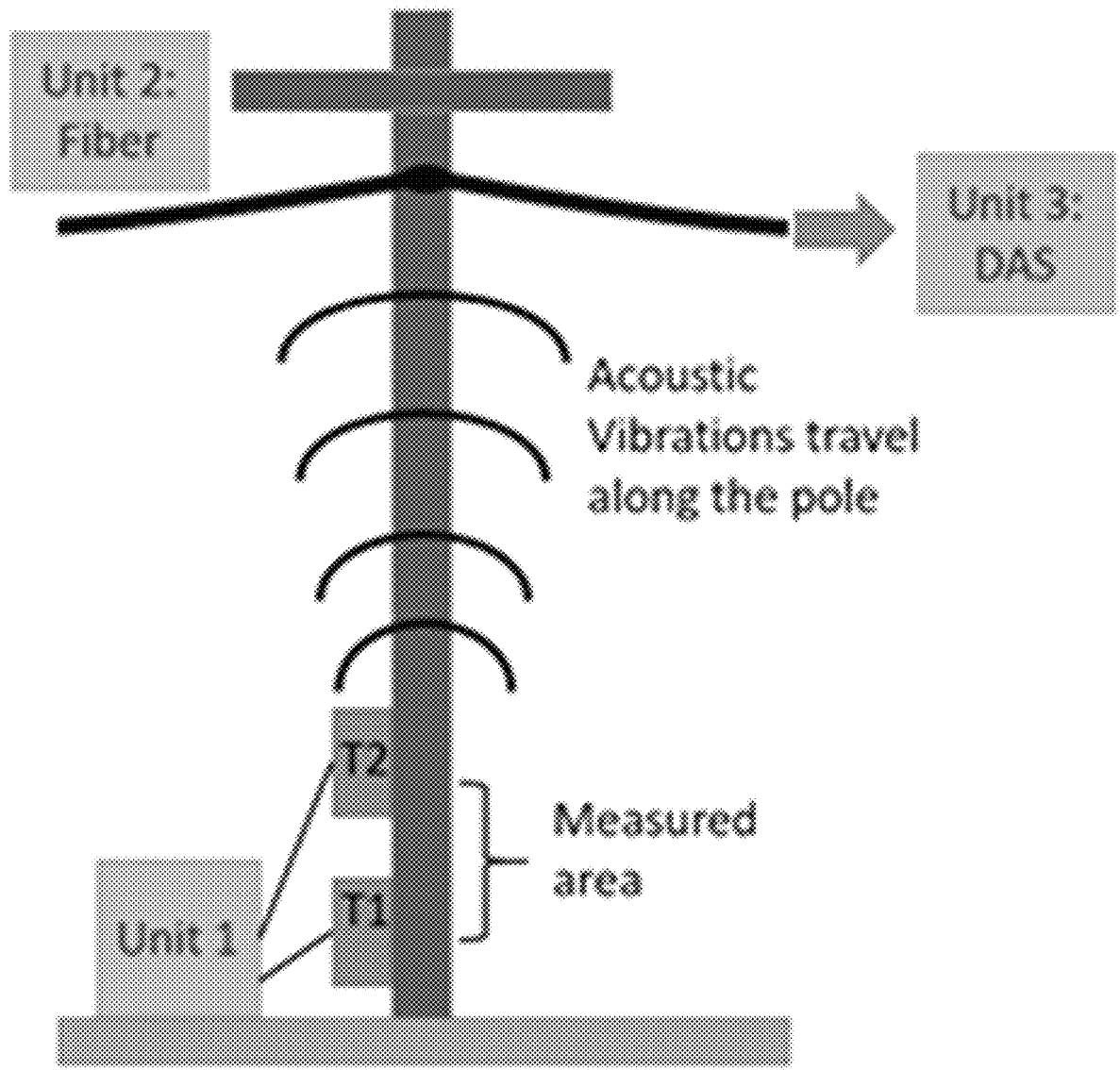
FIG. 3 is a schematic diagram illustrating operating principles of the layout of FIG. 2 according to aspects of the present disclosure.

FIG. 3 is a schematic diagram illustrating operating principles of the layout of FIG. 2 according to aspects of the present disclosure. As may be observed from the figure, unit 1 initiates excitation of the transducers T1 and T1 at appropriate times. Acoustic vibrations produced by the transducers are conveyed (conducted) through the body of the utility pole and further induce strains in the optical fiber. Such strains are detected by the operation of the DAS—which may be conveniently located in a central office or other location (not specifically shown), such that the monitoring of a large number of optical fibers may be conveniently managed from a single location. Note further that the optical fiber employed as a "sensing" fiber for DAS, may itself serve other purposes—for example—it may carry telecommunications traffic as well as the DAS signals—both separately and simultaneously.

Operationally, systems, methods, and structures according to the present disclosure generally operate as follows.

At least two transducers are positioned on a structure to be measured at predetermined locations. For example—and as illustratively shown in the figure, two transducers (T1, T2) are positioned on the utility pole with a predetermined distance between them ($\Delta h$). The transducers are connected to the same acoustic signal generator denoted as Unit 1.

The Unit 1 generates acoustic impulses/vibrations with predefined temporal differences ($\Delta t$) through the two (or more) different transducers.

All the signals generated by the Unit 1 are conveyed to the optical fiber through the main body of the structure (a utility pole in this illustrative example), and cause a varying strain on the fiber cable suspended on the utility pole.

The strain on the fiber is remotely detected and recorded by the DAS system located at the central office.

At the central office, based on the recorded arrival times of the impulses, an average wave speed along the structure between the two transducers is determined.

By placing the two transducers at different positions on the structure, an average wave speed distribution throughout the structure is determined.

Those skilled in the art will now understand and appreciate such determinations. Notably, the first transducer generates an acoustic impulse/signal at time $t_1$, and at height on the pole $h_1$. This impulse is detected by the DAS system at time The second transducer creates the same signal at $t_2=t_1+\Delta t$, and at height $h_2=h_1+\Delta h$. This second signal is again detected by the DAS at time $\tau_2=\tau_1+\Delta\tau$.

Since the parameters: $\Delta t$, $\Delta h$, and $\Delta\tau$ are known, it can be shown that the average wave-speed of the acoustic signal along the structure is given by the following relationship:

$$v = \left|\frac{\Delta h}{\Delta\tau - \Delta t}\right|$$

This speed is related to the bulk modulus and stiffness of the structure. One key point is that the measured wave-speed is a local measurement and depends only on the structural parameters of the area between the two transducers. By placing transducers at different locations along the structure, it is possible to scan the whole structure and map the acoustic wave-speed distribution of a structure. Such can be performed by either relocating the transducers or providing a plurality of transducers at known locations on the utility pole.

Figure 4:
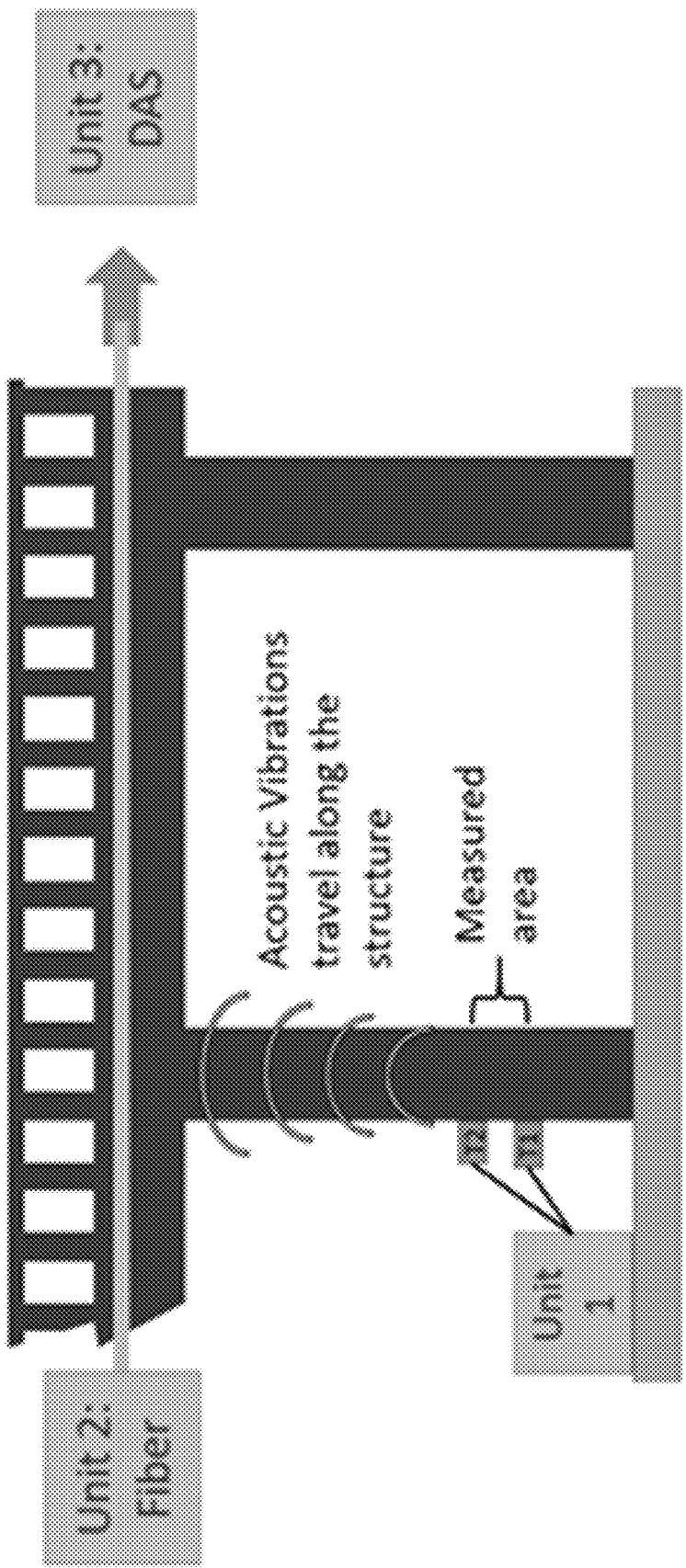
FIG. 4 is a schematic diagram illustrating an example application for a bridge infrastructure according to aspects of the present disclosure.

FIG. 4 is a schematic diagram illustrating an example application for a bridge infrastructure according to aspects of the present disclosure. As shown in this figure, a bridge has installed thereto an optical fiber which in turn is in optical communication to a DAS that may be located in a central office or another convenient location. Shown further is unit 1, which includes transducers T1 and T2, which in turn are operational to produce acoustic vibrations that travel along the bridge structural component shown. The vibrations induce strains in the optical fiber installed which are detected by operation of the DAS.

As will be understood and readily appreciated by those skilled in the art our inventive systems, methods, and structures according to aspects of the present disclosure may advantageously be employed with substantially any infrastructure including buildings, tunnels, bridges or any structure wherein an acoustic wave speed may be measured.

As those skilled in the art will further appreciate, by repeatedly monitoring/measuring such acoustic wave speed in a structure over time, it may be determined whether or not the structure is deteriorating over time such that remedial measures may be employed.

Figure 5:
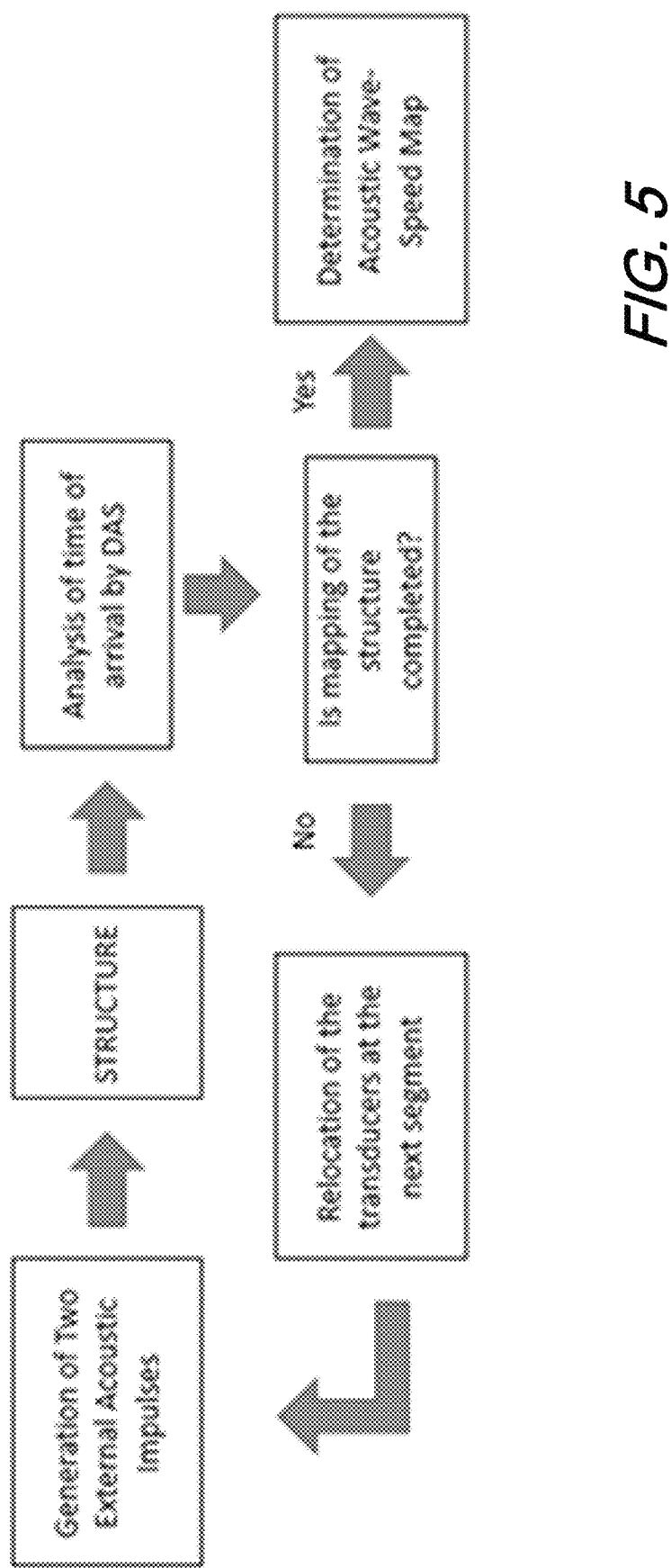
FIG. 5 is a flow diagram illustrating an operating method according to aspects of the present disclosure.

FIG. 5 is a flow diagram illustrating an operating method according to aspects of the present disclosure. As outlined in the flow diagram, systems, methods and structures according to aspects of the present disclosure advantageously integrate an external acoustic impulse source with a DAS system to determine an acoustic wave-speed on/within an infrastructure/structure at different locations of that structure. More specifically, our inventive systems, methods, and structures according to aspects of the present disclosure use at least two consecutive impulses at different times and positions, measuring a time of flight of acoustic waves generated, and mapping the acoustic wave-speed distribution along the structure.

At this point, while we have presented this disclosure using some specific examples, those skilled in the art will recognize that our teachings are not so limited. Accordingly, this disclosure should only be limited by the scope of the claims attached hereto.

The invention claimed is:

1. A method of monitoring civil infrastructure using distributed fiber optic sensing (DFOS)—distributed acoustic sensing (DAS), the method comprising:
    providing a length of optical fiber, at least a portion of which is positioned in physical contact with the civil infrastructure; and
    providing a distributed optical fiber sensing—distributed acoustic sensing interrogator in optical communication with the length of optical fiber;
    providing at least two acoustic transducers positioned on the infrastructure and operating the transducers such that acoustic impulses/vibrations with predetermined temporal differences are generated;
        generating by a first one of the acoustic transducers a first acoustic impulse at time $t_1$, and at location $h_1$ on the infrastructure; and
        detecting this impulse generated by the first one of the acoustic transducers by the DOFS-DAS system at time $\tau_1$;
    operating the DFOS-DAS to detect/determine strain(s) induced into the optical fiber by the acoustic impulses/vibrations; and
    determining, from the detected strain(s), an average wave speed of the acoustic impulses in the infrastructure;
    generating by a second one of the acoustic transducers a second acoustic impulse substantially identical to the first acoustic impulse at time $t_2=t_1+\Delta t$, and at location $h_2=h_1+\Delta h$ on the infrastructure; and
    detecting this impulse generated by the first one of the acoustic transducers by the DOFS-DAS system at time $\tau_2=\tau_1+\Delta\tau$;
    wherein the at least two acoustic transducers are spaced apart from one another by a predetermined distance.

2. The method of claim 1 further comprising determining an average wave-speed of the acoustic signal along the infrastructure according to the following:

$$v = \left|\frac{\Delta h}{\Delta\tau - \Delta t}\right|.$$

3. The method of claim 2 further comprising relocating the transducers on the infrastructure and subsequently obtaining average wave-speed information at multiple regions of the infrastructure.

* * * * *